United States Patent [19]

Takahashi et al.

[11] Patent Number: 5,380,485
[45] Date of Patent: Jan. 10, 1995

[54] APPARATUS FOR CONDUCTING AND CONTROLLING CHEMICAL REACTIONS

[75] Inventors: Shizuo Takahashi; Takao Kobayashi, both of Fukui, Japan

[73] Assignee: Todoroki Sangyo Kabushiki Kaisha, Fukui, Japan

[21] Appl. No.: 946,779

[22] Filed: Sep. 18, 1992

Related U.S. Application Data

[63] Continuation of Ser. No. 568,709, Aug. 17, 1990, abandoned.

[30] Foreign Application Priority Data

Aug. 28, 1989 [JP] Japan .................. 1-222160

[51] Int. Cl.⁶ ........................................... G05D 23/00
[52] U.S. Cl. ........................ 422/62; 422/106; 422/109; 422/111; 422/116
[58] Field of Search ............. 422/62, 67, 106, 108, 422/110, 111, 116, 109; 222/58; 435/289, 290, 316

[56] References Cited

U.S. PATENT DOCUMENTS

| | | | |
|---|---|---|---|
| 2,984,386 | 5/1961 | White | 222/58 |
| 3,749,285 | 7/1973 | Latham, Jr. | 222/58 |
| 3,926,738 | 12/1975 | Wilson | 435/289 |
| 3,940,492 | 2/1976 | Ehnstrom | 435/316 |
| 4,052,261 | 10/1977 | Messing et al. | 435/313 |
| 4,212,950 | 7/1980 | Adams | 435/316 |
| 4,264,741 | 4/1981 | Friedman et al. | 435/316 |
| 4,371,623 | 2/1983 | Taylor | 435/289 |
| 4,411,649 | 10/1983 | Kamen | 222/58 |
| 4,590,158 | 5/1986 | Eikman | 435/290 |
| 4,702,888 | 10/1987 | Borgialli | 422/50 |
| 4,840,905 | 6/1989 | Kearns et al. | 435/316 |
| 4,844,298 | 7/1989 | Ohoka et al. | 222/58 |

*Primary Examiner*—James C. Housel
*Assistant Examiner*—Jan M. Ludlow
*Attorney, Agent, or Firm*—Staas & Halsey

[57] ABSTRACT

Apparatus for conducting and controlling chemical reactions, wherein idealistic reaction conditions are achieved automatically for chemical reaction systems in a reaction vessel. The apparatus includes a pH-sensor, a temperature sensor and a vacuum sensor in the reaction vessel. The apparatus also includes electronic scales to measure the weight change in additive liquid containers linked with liquid flow mechanisms to supply additive liquids into the reaction vessel. A cooling mechanism is provided to cool the reaction vessel and a vacuum mechanism is provided to degas the inner space of the reaction vessel. A CPU is arranged to control the liquid flow mechanisms, the cooling mechanism and the vacuum mechanism based on calculated values derived from signals issued by the sensors and the scales.

3 Claims, 2 Drawing Sheets

APPARATUS FOR CONDUCTING AND CONTROLLING CHEMICAL REACTIONS

This application is a continuation of application Ser. No. 07/568,709, filed Aug. 17, 1990, now abandoned.

BACKGROUND OF THE INVENTION

1. Field of the Invention

The present invention relates to apparatus for conducting and controlling chemical reactions, and more particularly to practical apparatus, wherein various kinds of liquids such as catalysts, solvents, and acidic or basic solutions for pH control may be added correctly and automatically when needed whereby proper reaction parameters and reaction speeds may be maintained. In addition, in the apparatus of the invention, excess gases may be automatically removed. The apparatus of the invention has great utility for automatic management of chemical reaction tests in various industrial fields.

2. The Prior Art

As is presently well known, research institutes and laboratories are often called upon to conduct actual experiments and to observe chemical reactions such as condensation and/or polymerization reactions involving chemicals such as polymers or monomers. Often large research institutes are required to perform a large number of chemical experiments simultaneously, and in these experiments dealing with chemical reactions, proper management is an absolute necessity for all operating conditions such as the proper supply of additive liquids including catalysts, solvents and acidic or basic pH-adjustment solutions, control of reaction kenetics and removal of excess gases evolving from or dissolved in residual acid solutions, and the experiments sometimes might create hazardous situations, such that constant surveillance is required.

In the past, a single person in charge of this kind of experimentation could handle only about three to five experimental apparatuses, at best, in view of physical limitations and safety considerations. In order to operate a multiplicity of these apparatuses at one time, a large number of people have been needed for the management thereof. In view of present economical conditions, personnel expenses have a great influence upon total cost involvement, and therefore it is now desirable to minimize such personnel expenses.

SUMMARY OF THE INVENTION

The present invention has as an important objective, the provision of apparatus for conducting and controlling chemical reactions, wherein a large number of individual chemical reaction apparatuses can be managed and controlled by a limited number of persons with an accuracy of surveillance which cannot be realized in the prior art.

The invention has as another object the provision of practical and novel apparatus, wherein various kinds of additive liquids such as catalysts, solvents and acidic or basic pH-adjusting liquids can be added correctly and automatically whenever they are needed.

A further object of the present invention is to provide an apparatus for accurately controlling chemical reactions, wherein removal of excess gases from residual acid solutions can be automatically performed.

The invention has as a further objective, the provision of an apparatus for safely controlling chemical reactions, wherein reaction speed can be maintained and stabilized, and excessive reaction rates are avoided so that the expected results for the chemical reactions can be obtained.

Other objects and features of the invention will become apparent from the description thereof which follows.

In accordance with the invention the following three related means result in the achievement of the aforesaid objects of this invention:

A) Means including a sensor positioned in a reaction vessel containing a chemical reaction system whereby progressive degrees of chemical change, volume change, quality change and physical change may be detected as guidelines for the progress of the chemical reactions.

B) Means for calculating the necessary remedial steps after comparing present time values with preset standard values for various progressive degrees of change detected by the sensors.

C) Means for independently driving (1) mechanisms for adding a required amount of an additive liquid value based on a calculated remedial step into the reaction vessel, (2) mechanisms for regulating reactive temperatures in the reaction vessel, and (3) mechanisms for evacuating gas from the vessel and/or charging the vessel with inert gas.

DETAILED DESCRIPTION OF PREFERRED EMBODIMENTS

Figure 1:
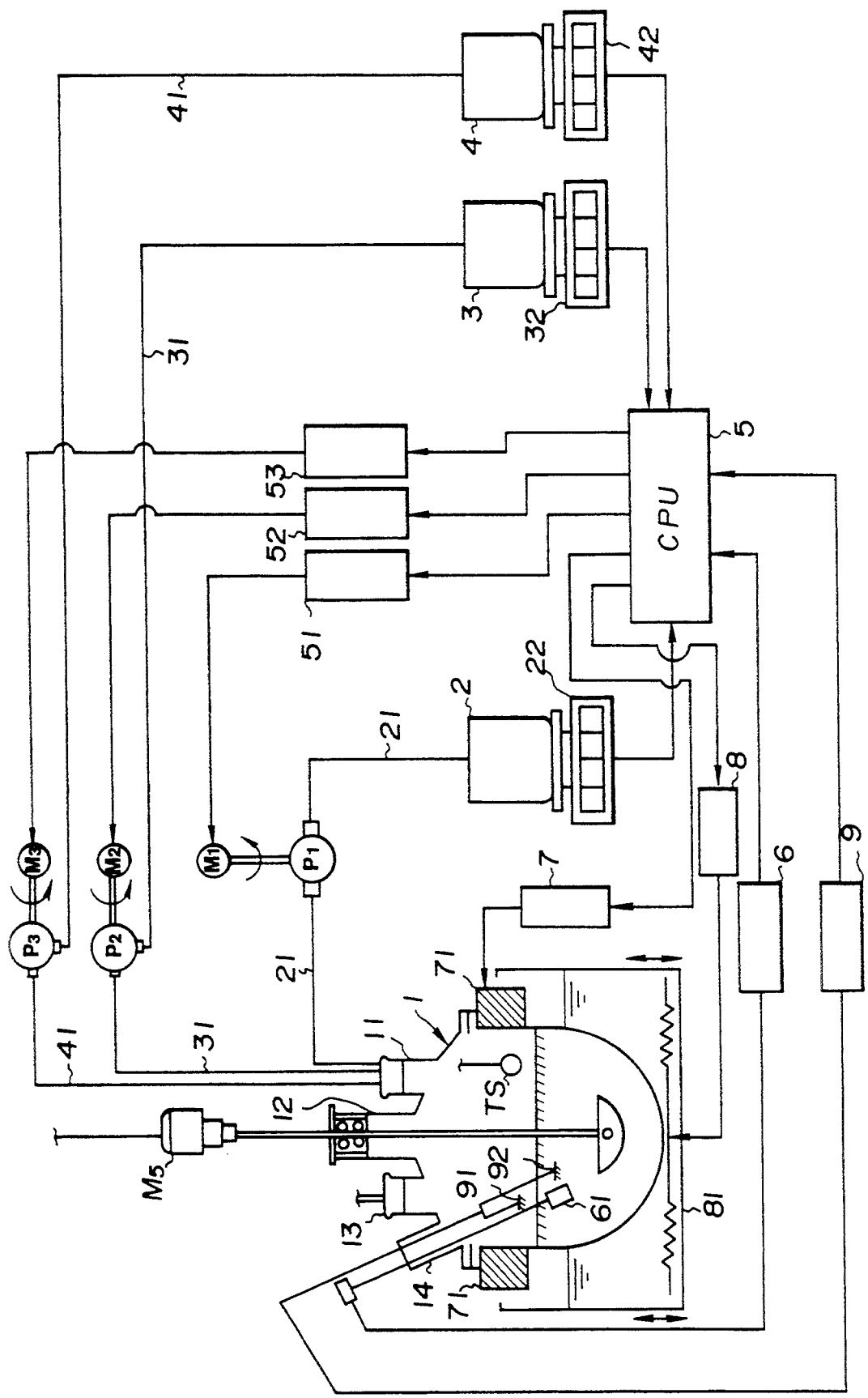
FIG. 1 is a block diagram illustrating the components of a general and basic apparatus for conducting and controlling chemical reactions pursuant to the principles and concepts of the present invention.
Figure 2:
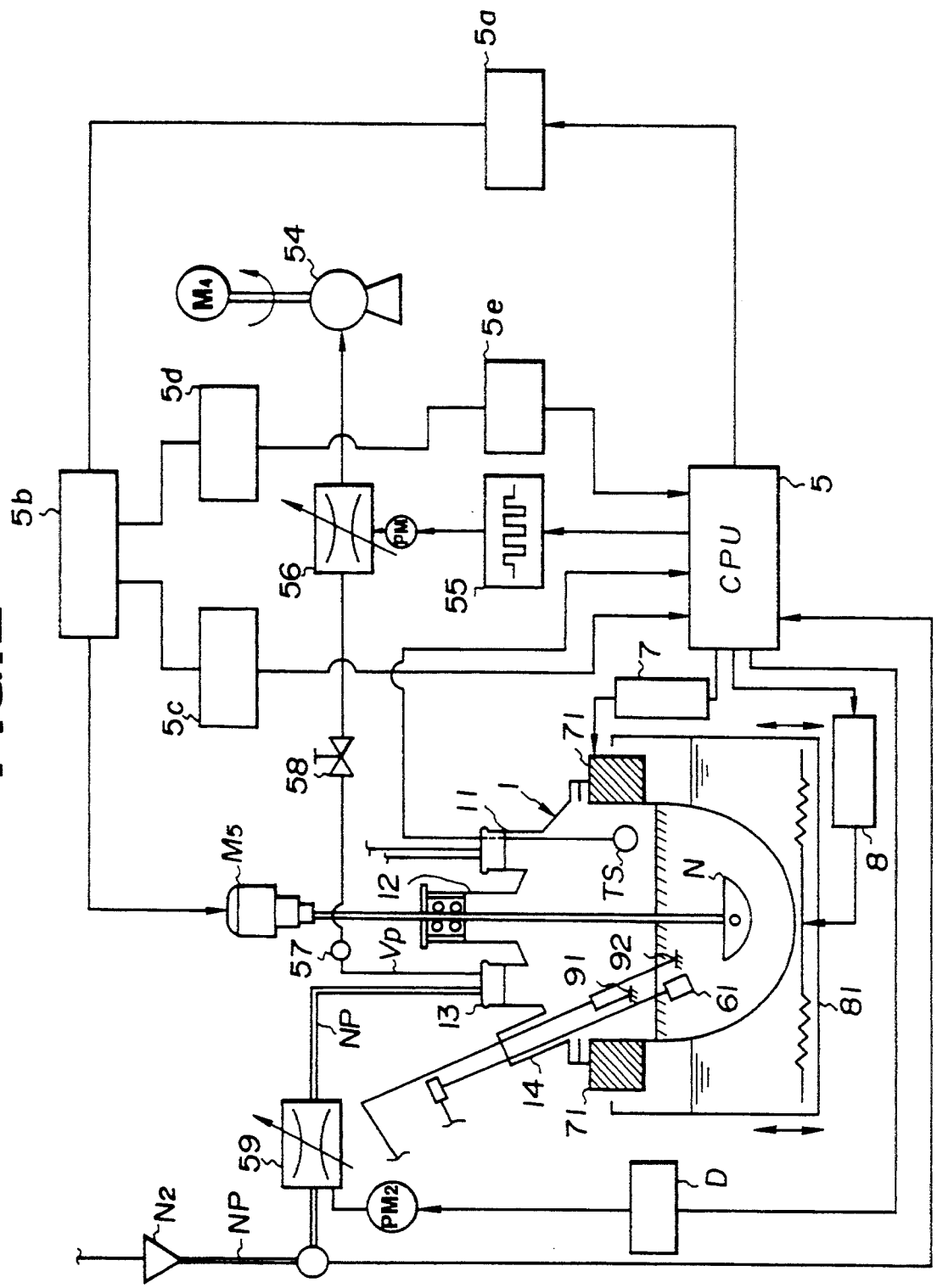
FIG. 2 is a block diagram illustrating additional components for the apparatus of FIG. 1.

Apparatus which embodies the concepts and principles of the invention is illustrated in the drawings. The apparatus includes a reaction vessel (1) for containing a liquid reaction system and having on its outer circumference a cooling element in the form of a refrigerating jacket (71) into which refrigerant may be supplied. As shown in FIGS. 1 and 2, the vessel (1) has four cylindrical mouths or openings, (11), (12), (13) and (14).

A pipe (21) communicating with a liquid container (2) containing a catalytic liquid to be added to the system in the vessel (1), a pipe (31) communicating with an acidic liquid container (3) containing an acidic liquid to be added to the reaction system, and a pipe (41) communicating with a liquid container (4) containing a basic liquid to be added to the system, are all arranged so as to project into the vessel (1) through the opening (11). A ceramic pump ($P_1$) driven by a pulse motor ($M_1$) is arranged to move liquid along pipe (21) and into the vessel (1), a ceramic pump ($P_2$) driven by a pulse motor ($M_2$) is arranged to move liquid along the pipe (31) and into the vessel (1), and a ceramic pump ($P_3$) driven by a pulse motor ($M_3$) is arranged to move liquid along the pipe (41) and into the vessel (1). By rotational control of the motors ($M_1$) ($M_2$) and ($M_3$), the required amount of each respective liquid may be supplied to the vessel (1).

The regulation of the flow volume for the additive liquid (catalytic liquid in this case) through the pipe (21) may be conducted as follows. When the pulse motor ($M_1$) is driven, the ceramic pump ($P_1$) starts to move the additive liquid contained in the additive liquid container (2) into the reaction vessel (1), and at that time, the decreasing weight of the liquid in the additive liquid container (2) is constantly detected and monitored by timely measurement with a first electronic scale (22). The scale (22) provides a signal corresponding to the present time detected weight value of liquid in the container (2) and such signal is transferred to a Central Processing Unit (CPU) (5). The CPU (5) compares the signal value outputted by the first electronic scale (22) with a preset standard value and produces a revised signal calling for adjustment of the difference between the two values to zero. The revised signal is transferred into a first speed adjustor (51) having a digital-analog converter circuit and a noise killer circuit, and the revised signal, which has been in the form of a digital signal, is converted by the adjustor (51) into a pulse signal. The pulse signal from the adjustor (51) is inputted into the pulse motor ($M_1$) as instructions to rotate a sufficient number of times to cause the current weight value of the container (2) to become equal to the standard value. In this embodiment, a 16-bit personal computer, No. PC-9801, made by Nihon Electric Company, may be used as the CPU (5).

The flow of the pH adjustment liquids (acidic liquid and basic liquid) through the pipes (31) (41) is controlled and regulated as follows. A pH-sensor (61) having a glass electrode is inserted into the chemical liquid system undergoing reaction in the vessel (1) through the opening (14). The sensor (61) measures the electric potential value in proportion to hydrogen ion concentration in the reaction system and outputs a present time pH-value signal to be transferred to the CPU (5).

If the present time pH level signal is larger than a preset standard value for the idealistic reaction (a standard value of pH 5 for example), the CPU (5) transfers an acid reaction supply signal to a second speed adjustor (52) so that the difference between the values may be eliminated correctly. The second speed adjustor (52), which obtains the acid reaction supply signal from the CPU (5) converts the digital signal into a pulse signal and inputs the pulse signal in the pulse motor ($M_2$), which drives the ceramic pump ($P_2$) for the required number of rotations. Thus, an appropriate quantity of acidic liquid is drawn up from the acidic liquid container (3) and moved into the reaction vessel (1) through the pipe (31), resulting in the achievement of the standard pH level in the reaction system.

On the other hand, if the present time pH level signal is smaller than the preset standard value, the CPU (5) transfers a basic reaction supply signal to a third speed adjustor (53) so that the difference between the values may be eliminated. The third speed adjustor (53), using a procedure which is the same as the procedure explained above, changes the digital signal into a pulse signal which is inputted into the pulse motor ($M_3$) driving the ceramic pump ($M_3$), whereby basic liquid is drawn up from the basic liquid container (4) and is moved into the reaction vessel (1) via the pipe (41).

The flow volume of the acidic liquid and basic liquid is regulated using second and third electronic scales (32) (42) respectively for proper control, and the weight measurements and signal generations are performed in exactly the same way as in the procedures explained above for the regulation of the flow of the catalytic additive liquid.

Reactive heat generated in the reaction vessel (1) is regulated as follows. The refrigerating jacket (71) is arranged to cover the outer circumference of the reaction vessel (1) and operates to freeze the liquid chemical system contained in the vessel (1) by use of a cooler (7). The cooler (7) may optionally be operated to cool the system to a required operating temperature. A heating tub (81) containing a heating substance is arranged beneath the reaction vessel (1), and by operation of a heater (8), the chemical reaction system contained in the reaction vessel (1) may be heated to a required reaction temperature on demand. The heating tub (81) may be moved up and down with an elevating mechanism in accordance with the arrow signs in FIG. 2, although the details of such mechanism are known and are not shown in this specification.

The cooling mechanism, which includes the jacket (71) and the cooler (7), and the heating mechanism, which includes the tub (81) and the heater (8), operate in accordance with temperature stages detected by a temperature sensor(TS) as follows:

1) As long as the temperature in the liquid reaction system in the vessel (1) remains within a predetermined safety range, neither the cooling mechanism nor the heating mechanism is called upon to do any work. The safety range as mentioned here includes the temperature zone where the chemical reactions proceed normally and uniformly and in a stable fashion. This zone is prearranged based on values determined empirically.

2) Whenever the temperature in the reaction system in the vessel (1) rises above the safety zone and into the dangerous area, the cooling mechanism (7) (71) is operated to lower the temperature back into the safety zone. The dangerous area mentioned here is the temperature area where chemical liquid reaction systems experience extreme reactions such as sudden ebullition, firing and/or explosion. This dangerous area is again predetermined based on values determined empirically to thus prevent unexpected accidents.

3) When the temperature in the reaction system in the vessel (1) is below the safety range, the heating tub (81) may be raised so as to bring the heating substance into contact with the reaction vessel (1), and the heater (8) is switched on to heat the container up to the desired reaction temperature.

In order to obtain and maintain the necessary reaction conditions for the chemical system contained in the reaction vessel (1), extra gas (for instance, oxygen chlorine and carbonic acid gas) which may interfere with the progress of the chemical reaction, must be removed from the proximity of the liquid system, and such removal may be accomplished using the regulating mechanisms illustrated in FIG. 2.

With reference to FIG. 2, a vacuum pump (54) is operated so that gases present in the vessel (1) may be evacuated through a degassing pipe(VP) communicating through the cylindrical opening (13). In this situation, the CPU (5) issues a signal consisting of degassing instructions, and when the signal is inputted into a driver (55), the latter converts the degassing signal into a pulse signal. The thus generated pulse signal is supplied to a pulse motor(PM) to initiate the rotation thereof at the required angular velocity. As the pulse motor (PM) rotates, a flow regulating valve (56) arranged in the degassing pipe (55) opens to facilitate evacuation of the reaction vessel (1) at the instructed flow rate. When the interior of the reaction vessel (1) becomes evacuated to the required degree, a vacuum sensor (57) detects the pressure situation and issues a signal to deenergize the pulse motor (PM) and close a vacuum cock (58). The CPU (5) then issues a signal consisting of freezing instructions to cause operation of the cooler (7) for cooling the refrigerating jacket (71), to cause the chemical liquid in the vessel (1) to become frozen. When freezing occurs, the temperature sensor (TS) installed in the reaction vessel (1) detects the situation and issues a freezing signal. When the vacuum signal issued by the vacuum sensor (57) and the freezing signal issued by the temperature sensor (TS) are both inputted together, the CPU (5) operates to open a flow regulating valve (59) in an inert gas pipe(NP) to introduce inert gas (nitrogen, for example) at the required flow rate via a driver (D) into the reaction vessel (1).

When the vessel (1) is filled with inert gas, the CPU (5), in correspondence with the vacuum sensor (57), operates the heater (8) to elevate the temperature in the heating tub (81) so that it is able to thaw the chemical liquid system in the reaction vessel (1). The CPU (5) also operates to open the vacuum cock (58) for repeated degassing by the vacuum pump (54) under the regulation of the flow regulating valve (56).

As explained above, the linked steps of evacuation and refilling with inert gas, freezing of the chemical reaction system liquid, thawing of the liquid, and repeated degassing, all of which contribute to the desired removal of residual gases from the chemical liquid system, reduce obstacles which otherwise would interfere with the progress of the desired reaction. All of these operations may be automatically performed using the reaction apparatus of the invention.

The apparatus of the invention may be used to conduct surveillance of the liquid system in the vessel (1) as follows. As shown in FIGS. 1 and 2, an upper limit level sensor (91) and a lower limit level sensor (92) may be inserted into the reaction vessel (1) through the cylindrical opening (14). Thus, when the liquid level rises to contact the upper level sensor (91) as a result of the occurrence of bubbles caused by the influence of reactive heat, the sensor (91) is actuated to issue a signal to the level detector (9), and the level detector (9) in turn produces an electric upper limit signal which is transferred to the CPU (5). The CPU (5) then opens a ventilation valve (not shown in the drawings) to reduce the pressure in the reaction vessel (1) to normal atmospheric pressure, whereupon overflow of chemical liquid is avoided.

On the other hand, when the liquid level in the vessel (1) drops to the level of the lower limit sensor (92), the latter signals this fact to the level detector (9), and the level detector (9) produces an electric lower limit signal which is transferred to the CPU (5). The CPU (5) then generates and transfers a signal to the first speed adjustor (51) to operate the ceramic pump ($P_1$), whereon catalytic liquid is withdrawn from the container (2) and is supplied to the reaction vessel (1).

The preferred embodiments of this invention have been explained above; however, the invention is not limited to these embodiments alone. Various amendments or changes are available based on the scope as described in this specification or in the claims appended hereto. For instance, a mechanism may be provided for stirring the chemical system in the reaction container (1). Such mechanisms may take the form of a stirring propeller (N) driven by the DC motor ($M_5$). The DC motor ($M_5$) may be operated at a constant rotational speed under the influence of a servomechanism ($5b$) operating via a digital-analog converter ($5a$). The rotational torque of the DC motor ($M_5$) for constant speed may be calculated by a torque calculator ($5c$) and transferred to the CPU (5). The rotational speed may be calculated by a rotation calculator ($5d$) as an analog signal which is also communicated to the CPU (5) after it is converted into a digital signal via an analog-digital converter ($5e$). Thus, the CPU (5) controls the servomechanism ($5b$) via the digital-analog converter ($5a$) so as to operating the DC motor ($M_5$) properly whenever the rotational torque or rotational speed need to be changed to accommodate changes in the viscosity of the chemical system in the reaction vessel (1).

As explained in the actual embodiments set forth above, the apparatus provided by this invention accomplishes (1) the automatic and economical management of the proper supply of additive liquids like catalytic liquids or solvents and for pH-control to the liquid reaction system; (2) the removal of excess gases from the proximity of chemical liquids to be reacted; and (3) the stabilization of procedures for chemical reactions through proper restraint of excessive reactions in the chemical reaction system. Therefore, the apparatus of the invention is useful for present requirements where a number of chemical experiments should be managed properly and concurrently, and is also useful to rationalize and economize chemical experimentation where in the past a large number of people were needed for managing and watching a variety of experiments.

What is claimed is:

1. Apparatus for conducting and controlling a chemical reaction comprising:

a reaction vessel for receiving, mixing and containing a liquid reaction system comprising a plurality of liquid components;

a first container for holding a supply of additive acidic liquid to be supplied to the vessel during a reaction;

a second container for holding a supply of additive basic liquid to be supplied to the vessel during a reaction;

a third container for holding a supply of another additive liquid to be supplied to the vessel during a reaction;

a respective electronic scale for each of said containers, each said being adapted for measuring the weight of the liquid in the corresponding container and generating an electric signal corresponding to a present time supply level of the liquid therein;

a pH detector including a sensor in the reaction vessel for monitoring the pH in the reaction system and generating an electric signal corresponding to a present time pH level in the system;

a temperature sensor in the reaction vessel for detecting the temperature of the reaction system therein and generating an electric signal corresponding to the present temperature of the system;

a cooling mechanism including a cooling jacket surrounding the vessel for receiving and circulating a coolant in contact with the outer surfaces of the reaction vessel to thereby cool the reaction system in the reaction vessel;

a heating mechanism including heating tub containing a heated substance and an elevator for raising and lowering the tub between a raised heating position and a lowered non-heating position, said tub being disposed beneath said vessel so that the heated substance therein is brought into contact with the outer surfaces of the vessel when the tub is in its raised heating position to thereby heat the reaction system in said reaction vessel;

a perspective pump associated with each container, each said pump being arranged for moving a corresponding liquid from its respective container and into said vessel in response to an external signal; and a CPU for receiving and processing the electric signals from said scales, said pH detector and said temperature sensors, using signals from the scales and from the pH detector to calculate the amount and nature of liquid to be added to the system in the reaction vessel to correct derivations from standards, generating the external signals as necessary to control the operation of said pumps to correct said deviations, using the signal from the temperature sensor to determine whether the temperature is within a predetermined range, generating a signal to raise the tub to its heating position whenever the temperature in the system is below said range, generating a signal to lower the tub to its non-heating position whenever the temperature of the system is above or within said range, and generating a signal to cause circulation of coolant in said jacket whenever the temperature of the system is above said range.

2. Apparatus for conducting and controlling a chemical reaction comprising:

a reaction vessel for receiving, mixing and containing a liquid reaction system comprising a plurality of liquid components;

a container for holding a supply of additive liquid to be supplied to the vessel during a reaction;

an electronic scale for measuring the weight of the liquid in the container and generating an electric signal corresponding to a present supply level of the liquid therein;

a pump associated with said container, said pump being arranged for moving liquid from the container and into the vessel in response to an external signal;

a temperature sensor in the vessel for detecting the temperature of the reaction system therein and generating an electric signal corresponding to the present temperature of the system;

a cooling mechanism including a cooling jacket surrounding the vessel for receiving and circulating a coolant in contact with the outer surfaces of the reaction vessel to thereby cool the reaction system in said vessel;

a heating mechanism including a heating tub containing a heated substance and an elevator for raising and lowering the tub between a raised heating position and a lowered non-heating position, said tub being disposed beneath said vessel so that the heated substance therein is brought into contact with the outer surfaces of the vessel when the tub is in its raised heating position to thereby heat the reaction system in said vessel; and a CPU for receiving the electric signals from the scale and the temperature sensor, comparing the present time supply level in the container with a preset standard level, generating the external signals as necessary to control the operation of the pump and revising the same as dictated by said comparison, using the signal from the temperature sensor to determine whether the temperature is within a predetermined range, generating a signal to raise the tub its heating position whenever the temperature in the system is below said range, generating a signal to lower the tub to its non-heating position whenever the temperature of the system is above or within said range, and generating a signal to cause circulation of coolant in said jacket whenever the temperature of the system is above said range.

3. Apparatus for conducting and controlling a chemical reaction comprising:

a reaction vessel for receiving, mixing and containing a liquid reaction system comprising a plurality of liquid components;

a first container for holding a supply of additive acidic liquid to be supplied to the vessel during a reaction;

a second container for holding a supply of additive basic liquid to be supplied to the vessel during a reaction;

a ph detector including a sensor in the reaction vessel for monitoring the pH in the reaction system and generating an electric signal corresponding to a present time pH level in the system;

a respective pump associated with each container, each said pump being arranged for moving the corresponding liquid from its respective container and into said vessel in response to an external signal;

a temperature sensor in the vessel for detecting the temperature of the reaction system therein and generating an electric signal corresponding to the present temperature of the system;

a cooling mechanism including a cooling jacket surrounding the vessel for receiving and circulating a coolant in contact with the outer surfaces of the reaction vessel to thereby cool the reaction system in said vessel;

a heating mechanism including a heating tub containing a heated substance and an elevator for raising and lowering the tub between a raised heating position and a lowered non-heating position, said tub being disposed beneath said vessel so that the heated substance therein is brought into contact with the outer surfaces of the vessel when the tub is in its raised heating position to thereby heat the reaction system in said vessel; and a CPU for receiving said electric signals from the pH detector and the temperature sensor, comparing the present time pH level with a preset standard level, generating the external signals to drive the pump associated with the first container if the present time pH level in the reaction system is greater than said standard level or to drive the pump associated with the second container if the present time pH level in the reaction system is below said preset level, using the signal from the temperature sensor to determine whether the temperature is within a predetermined range, generating a signal to raise the tub to its heating position whenever the temperature is in the system is below said range, generating a signal to lower the tub to its non-heating position whenever the temperature of the system is above or within said range, and generating the signal to cause circulation of coolant in said jacket whenever the temperature of the system is above said range.

* * * * *

UNITED STATES PATENT AND TRADEMARK OFFICE
CERTIFICATE OF CORRECTION

PATENT NO. : 5,380,485
DATED : January 10, 1995
INVENTOR(S) : SHIZUO TAKAHASHI et al.

It is certified that error appears in the above-indentified patent and that said Letters Patent is hereby corrected as shown below:

Column 6, line 43, after "said" insert --scale--;
       line 60, after "including" insert --a--.
Column 7, line 1, delete "perspective" and substitute --respective--;
       line 67, after "tub" insert --to--.
Column 8, line 60, delete "is".

Signed and Sealed this

Fourth Day of April, 1995

Attest:

BRUCE LEHMAN

Attesting Officer     Commissioner of Patents and Trademarks